(12) United States Patent
Palmer et al.

(10) Patent No.: US 7,278,752 B2
(45) Date of Patent: Oct. 9, 2007

(54) DEVICE FOR PROVIDING INTERNAL ILLUMINATION OF LIVE FLOWERS AND OTHER PRODUCTS

(75) Inventors: William R. Palmer, Rescue, CA (US); Stephen L. Palmer, Cameron Park, CA (US); Robert N. Palmer, Cameron Park, CA (US)

(73) Assignee: Chemical Light Inc., Vernon Hills, IL (US)

( * ) Notice: Subject to any disclaimer, the term of this patent is extended or adjusted under 35 U.S.C. 154(b) by 217 days.

(21) Appl. No.: 11/076,671

(22) Filed: Mar. 9, 2005

(65) Prior Publication Data

US 2006/0203474 A1    Sep. 14, 2006

(51) Int. Cl.
*F21S 6/00* (2006.01)

(52) U.S. Cl. .................. 362/122; 362/563; 362/805; 362/119

(58) Field of Classification Search ........ 362/563–564, 362/122–123, 118–120, 805; 200/61.19, 200/506; 606/4, 14; 607/91–93; 600/179, 600/249
See application file for complete search history.

(56) References Cited

U.S. PATENT DOCUMENTS

| | | | |
|---|---|---|---|
| 2,186,143 A * | 1/1940 | Neugass ..................... | 600/212 |
| 3,004,140 A * | 10/1961 | Gomes ....................... | 362/579 |
| 3,431,410 A | 3/1969 | Dolan et al. | |
| 3,455,622 A | 7/1969 | Cooper | |
| 3,624,385 A | 11/1971 | Wall | |
| 4,170,036 A | 10/1979 | Sussel | |
| 4,215,462 A | 8/1980 | Fernandez | |
| 4,325,110 A | 4/1982 | Tang | |
| 4,399,493 A | 8/1983 | Kurita et al. | |
| 4,551,129 A * | 11/1985 | Coleman et al. .............. | 604/21 |
| 4,616,304 A | 10/1986 | Von Kohorn | |
| 4,617,561 A * | 10/1986 | Brown ....................... | 340/628 |
| 4,626,968 A | 12/1986 | Von Kohorn | |
| 4,646,209 A | 2/1987 | Jansen | |
| 4,866,580 A | 9/1989 | Blackerby | |
| 5,063,485 A | 11/1991 | Harris | |
| 5,131,775 A * | 7/1992 | Chen ......................... | 401/195 |
| 5,253,149 A | 10/1993 | Ostema et al. | |
| 5,497,307 A | 3/1996 | Bae et al. | |
| 5,508,901 A | 4/1996 | Kuo | |
| 5,947,582 A | 9/1999 | Huang | |
| 5,951,140 A | 9/1999 | Feldman | |
| 6,076,940 A | 6/2000 | Sanford, Jr. | |
| 6,296,364 B1 | 10/2001 | Day et al. | |
| 6,874,188 B2 * | 4/2005 | Johnson et al. ................ | 7/158 |
| 2003/0035291 A1 | 2/2003 | Jensen et al. | |
| 2004/0085758 A1 | 5/2004 | Deng | |

* cited by examiner

*Primary Examiner*—Renee Luebke
*Assistant Examiner*—Robert May
(74) *Attorney, Agent, or Firm*—McHale & Slavin, P.A.

(57) ABSTRACT

A small light source for internally illuminating live flowers and other products is formed in the shape of a pin with a battery case operatively connected to the light source. A sharp penetrating tip surrounds the light source and is fixed to a rigid tube for manipulating the device to insert the light source within the structure of the plant. The device is of such a size that it can be supported by a plant without deformation of the plant.

11 Claims, 8 Drawing Sheets

DEVICE FOR PROVIDING INTERNAL ILLUMINATION OF LIVE FLOWERS AND OTHER PRODUCTS

FIELD OF THE INVENTION

This invention is directed to the field of illumination and in particular to the illumination of floral displays.

BACKGROUND OF THE INVENTION

Flowers and floral arrangements have been used throughout history as gifts and to convey sentiments. A single, long-stemmed rose can be an elegant expression of passion, while an elaborate floral bouquet might be used to celebrate a wedding or the birth of a child. The intricate designs and colorful patterns of flowers make them true objects of beauty. Each flower is unique, having its own particular shape and coloring.

Fresh flowers may also produce a pleasant fragrance that adds to the experience when a flower or bouquet is presented. Since the blossoms of flowering plants are typically short-lived, their transitory nature and short life makes them particularly special. While the visual beauty of these flowers is stunning, it can only be enjoyed when illuminated. This is unfortunate, since many of the locations where flowers are used are in areas of reduced lighting such as restaurants or dance venues.

Many attempts have been made to produce artificial flowers that mimic the beauty of live flowers. Often, thin silk or rayon fabrics are employed to fashion facsimiles of real flowers. The fabric is dyed or painted to resemble real flowers. In an attempt to add interest to these artificial flowers, some have been outfitted with electrically powered lighting devices. Even the best of these fakes however, can not compare with the delicate beauty of real flowers. Illuminated artificial flowers are no exception. It is unlikely that an individual would present his or her prom date with an artificial flower, even if illuminated.

Deng, U.S. application US2004/00885758, discloses a means for lighting artificial flowers employing a small light bulb or light emitting diode. In this embodiment a flower is assembled around the lighting means. When power is applied to the lamp, the artificial flower illuminates from within.

Harris, U.S. Pat. No. 5,063,485, discloses an illuminated artificial flower arrangement that includes a container with an electrical terminal block being mounted on the stem support.

Von Kohorn, U.S. Pat. No. 4,616,304, teaches a device for displaying three-dimensional objects to be centripetally viewed such as flower arrangements. The light source is contained in a lower cavity while the flowers are contained in an upper cavity.

Jansen, U.S. Pat. No. 4,646,209, discloses an illuminated standing support for plants which comprises a translucent material, a plant, a flower or other recipient provided in the upper part of said support and a light source installed on said holder for illumination of translucent support.

Kurita et al., U.S. Pat. No. 4,399,439, discloses an illuminated artificial flower ornament in which a miniature bulb is located in the peduncle part of an artificial flower.

Fernandez, U.S. Pat. No. 4,125,462, discloses a method for making a translucent optical diffuser for a flower lamp. A method of chemically treating animal bladders to convert them into diffusers is also disclosed.

Sanford, U.S. Pat. No. 6,076,940, discloses a planter light accessory for illuminating a plant within a container. A cylindrical housing contains a light source that is mounted on the edge of the cylindrical housing for illuminating the plant.

Huang, U.S. Pat. No. 5,947,582, discloses a flower shaped lamp including a mount for an artificial flower. A tubular stem of the artificial flower contains an electric wire that is connected to a bulb that is mounted on the artificial flower.

Kuo, U.S. Pat. No. 5,508,901, discloses a multicolored light-emitting flower decoration that employs chemiluminescent reagents to produce light.

Von Kohorn, U.S. Pat. No. 4,626,968, discloses a device and a system for indirect, substantially glare-free, directional lighting of objects such as plants and outdoor sculptures.

Tang, U.S. Pat. No. 4,325,110, discloses a vase-type illumination device comprising a transparent container, transparent base board, and a supporting stand and illuminating mechanism. The transparent base board can be either movably or immovably mounted on the underside of said container, while the flowers or various kinds of ornaments are inserted in place in the holding hole on the base board.

Dolan, U.S. Pat. No. 3,431,410, discloses an ornamental display having a multiplicity of fiber optic elements held together along a length adjacent one end and transversely unrestrained at the other end. A light source and a rotatable color wheel are positioned between the light source and the fiber bundle.

Wall, U.S. Pat. No. 3,624,385, discloses an adapter, which allows a spray of optical fibers to readily be connected or disposed in proximity to a light source.

Feldman, U.S. Pat. No. 5,951,140, discloses a display unit, typically intended for placement on a table that includes a plurality of flexible elongated electroluminescent sources connected to the individual display elements.

Cooper, U.S. Pat. No. 3,455,622, discloses a lighting device for transmitting light to inaccessible places using a bundle of optical fibers and a means of directing a concentrated column of visible light onto one end of the fibers. A means for substantially eliminating infrared energies from the concentrated column is disclosed.

Sussel, U.S. Pat. No. 4,170,036, discloses an article of jewelry which consists of first and second lengths of electrically conductive wire with a light emitting diode connected across a first set of the free ends of the wire lengths. An oscillator circuit and a low voltage power source are connected across the other free ends of the lengths of wire to provide a flashing circuit for the light emitting diode.

Blackerby, U.S. Pat. No. 4,866,580, discloses an ornamental lighting device which includes a housing defining a chamber therein and a power source disposed in the housing chamber. One or more LEDs are mounted in the housing wall. In one embodiment, the LEDs are provided with light enhancing members that serve to disburse, reflect or otherwise modify the light emitted from the LEDs.

Day et al., U.S. Pat. No. 6,296,364, discloses a light-emitting beaded necklace for ornamental decoration having a plurality of beads on an elongate thread. At lease one light source is enclosed within one of the beads.

Jensen et al., U.S. Application US2003/0035291, discloses an imitation candle having a body made from a translucent material having light transmissive properties similar to paraffin. The body is shaped to resemble a candle that is reduced by burning. An LED or similar high intensity light source is set in a cavity enclosed within this material. The LED emission levels are varied in a pseudo-random manner to simulate the flicker of candle light.

Ostema et al., U.S. Pat. No. 5,253,149, discloses illuminated jewelry connectable to a wearer as an earring, a clothes pendant or the like and includes a light emitting diode connected onto an enlarged flat base member at one end of an elongated stem.

Bae, U.S. Pat. No. 5,497,307, discloses illuminated jewelry that includes a housing containing a mercury switch, a mercury battery, a cap containing a light bulb, a clipping member for clipping to the wearer, whereby anytime the illuminating jewelry is moved, the jewelry illuminates in a blinking manner.

The use of small electric lamps to illuminate artificial flowers is known, but applicant is aware of no teaching that shows a means of illuminating real flowers from within. Indeed, no prior art found even suggests that it might be possible to propagate light through one or more layers of vegetable matter such as petals of a flower, so that a real plant might be illuminated from within for ornamental purposes.

SUMMARY OF THE INVENTION

Disclosed is a light source for internally illuminating live flowers and other products. The light source is formed in the shape of an elongated pin extending from a battery case having controls operatively connected to the light source. The elongated pin includes a sharp penetrating tip that surrounds the light source and is used for insertion within the structure of the plant, typically through the bottom of the flower or it can be concealed by placement through a stem and into the bottom of the flower. The device is of such a size that it can be supported by a plant without deformation of the plant.

Therefore, it is an objective of this invention to illuminate real flowers from within, permitting the beauty of these flowers to be enjoyed in many new venues of low ambient light and provide for an entirely new look for real flowers.

It is another objective of this invention to provide a sufficiently bright lighting means to reveal the internal structure of the flower as light passes through the flower petals, thereby yielding an even more fascinating sight.

It is a further objective of this invention to provide optimal visual effect by adjustably positioning the lighting source within the head of the flower. It is yet another objective of this invention to provide adjustable color and intensity of the light source for the optimal visual appearance of the illuminated flower.

The instant invention provides an economical, compact and effective means to illuminate real flowers from within the flower itself. Because the illumination source is from within the flower and not external to it, the visual effect is both surprising and pleasant.

An unexpected feature of the device of the instant invention is the ability of a single device to not only illuminate a single flower but also to cast significant light on adjacent flowers and thereby illuminates them as well.

While the device can be used with live, growing plants, it is anticipated that it will find most common use in cut flowers and arrangements of cut flowers. Additionally, the device could be used to illuminate food items from within, such as lemon or other fruit wedges or other products as well.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

The device of the instant invention functions by placing a light source comprising a penetrating tip inside the core of the object to be illuminated. The lighting and positioning means must not detract from the overall beauty of the flower and must not cause damage to the flower such that the life of the bloom is significantly shortened. The device must also be of a size and weight that does not cause the flower or the flower stem to deform significantly. Further, the device can be of such a size that it could be used in flowers or flower arrangements in which the flower stem is very short, such as in a corsage or boutonniere.

Figure 1:
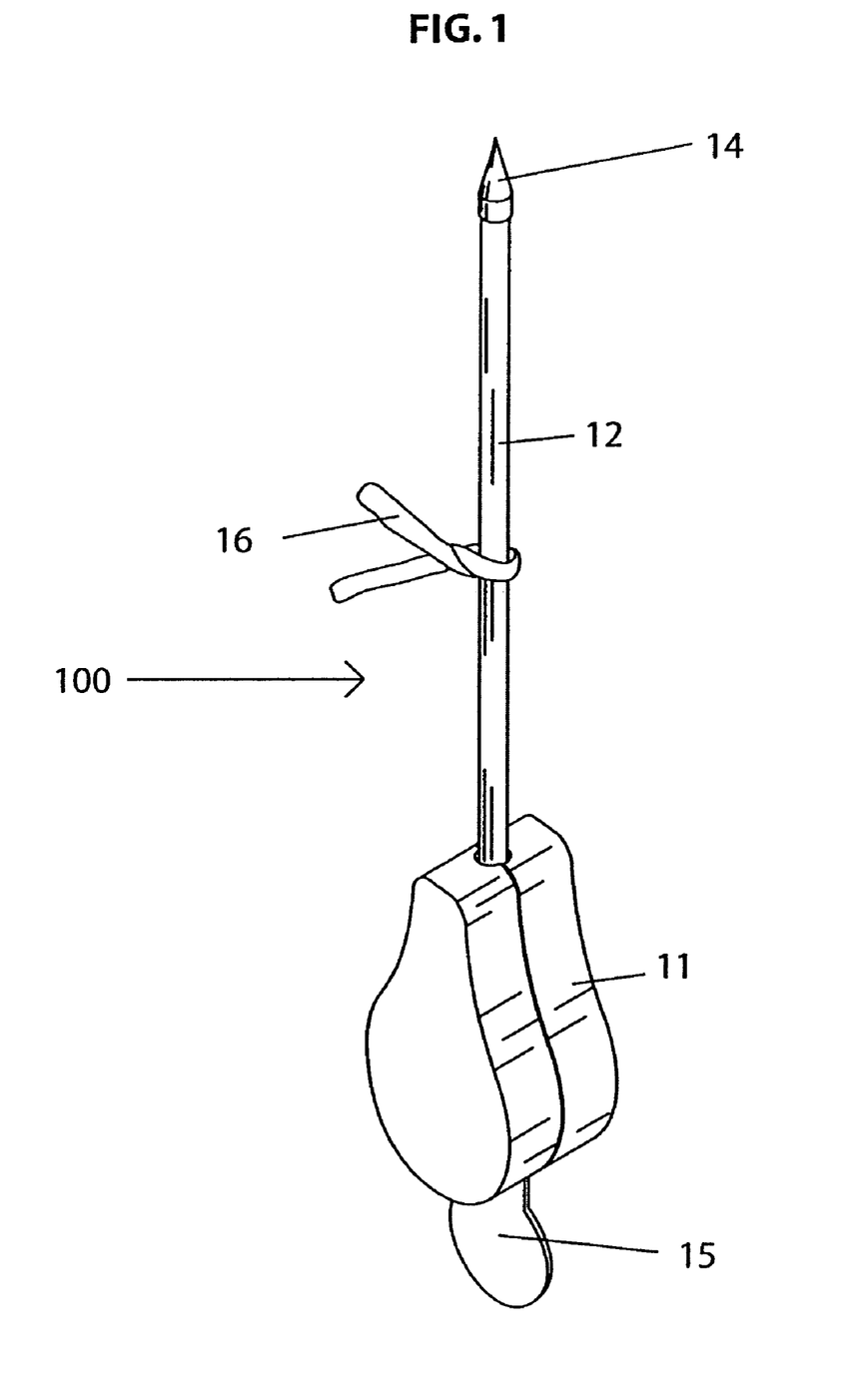
FIG. 1 shows one embodiment of the device of the instant invention.
Figure 1A:
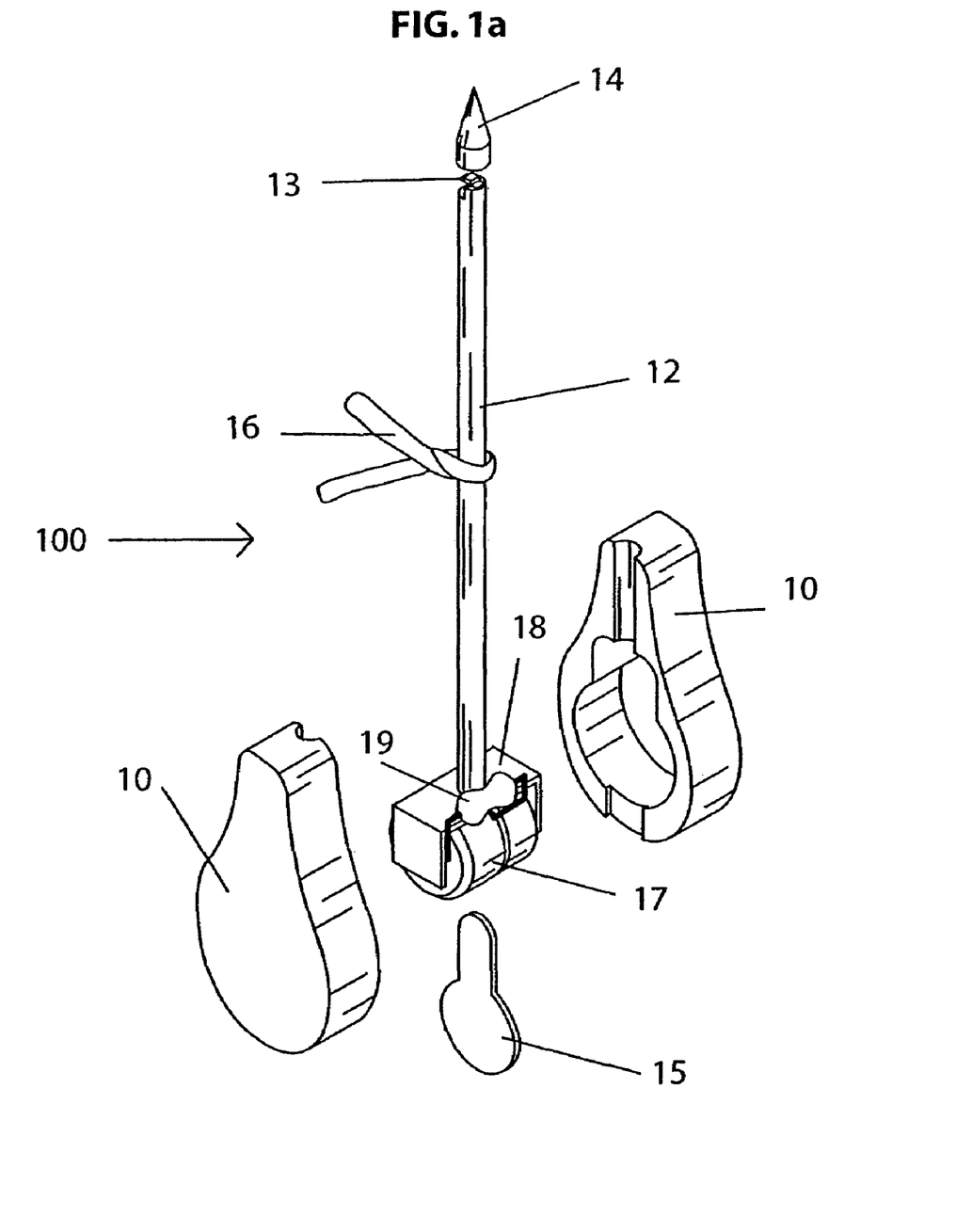
FIG. 1a is an exploded view of one embodiment of the device of the instant invention.
Figure 1B:
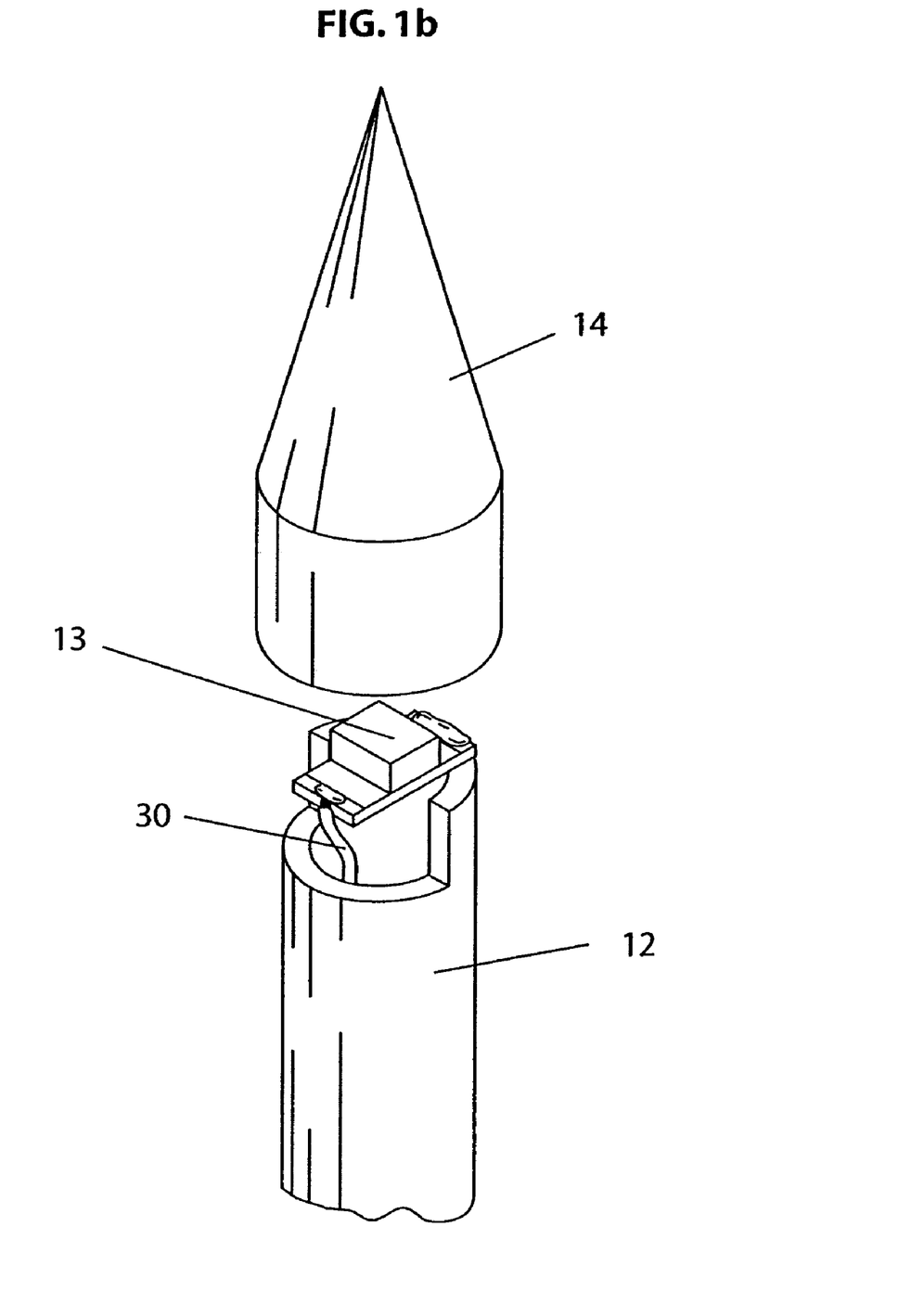
FIG. 1b is a detail view showing relationship of light source to tube and piercing tip.

One embodiment of the device of the instant invention 100, FIGS. 1, 1a and 1b, comprises case 11 which is attached to tube 12. The distal end of tube 12 is attached to light source 13 which is contained in penetrating tip 14. Contained within case 11 which is comprised of mating case members 10 is a power source such as a battery 17. A first terminal of the power source is electrically connected via spring contact 18 to tube 12, a second terminal of the power source is electrically connected to an electric wire 30, which runs inside the hollow tube 12. A resistor 19 may be employed in series fashion in this circuit to limit current to light source 13. Light source 13 may be an LED, incandescent lamp or any other suitable source. Now referring to FIG. 1b, first contact of light source 13 is electrically connected to the distal end of tube 12, typically by soldering or other suitable method of bonding. A second contact of light source 13 is electrically connected to the free end of electric wire 30 thereby completing the circuit. Tube 12 may comprise a "stepped" end to facilitate bonding of light source 13 to tube 12 while permitting the electric wire to be routed and bonded to the second contact of light source 13. Pull-tab 15, which may be a strip of plastic, or other electrical insulator serves as a switch to power the device on. Pull-tab 15 may be placed between the batteries or other electrical contacts of the circuit as illustrated in FIG. 1a. When pull-tab 15 is removed, the electrical circuit is completed and light source 13 is activated. Other known methods of switching the circuit on and off are anticipated and deemed to be within the scope of the instant invention.

Figure 1C:
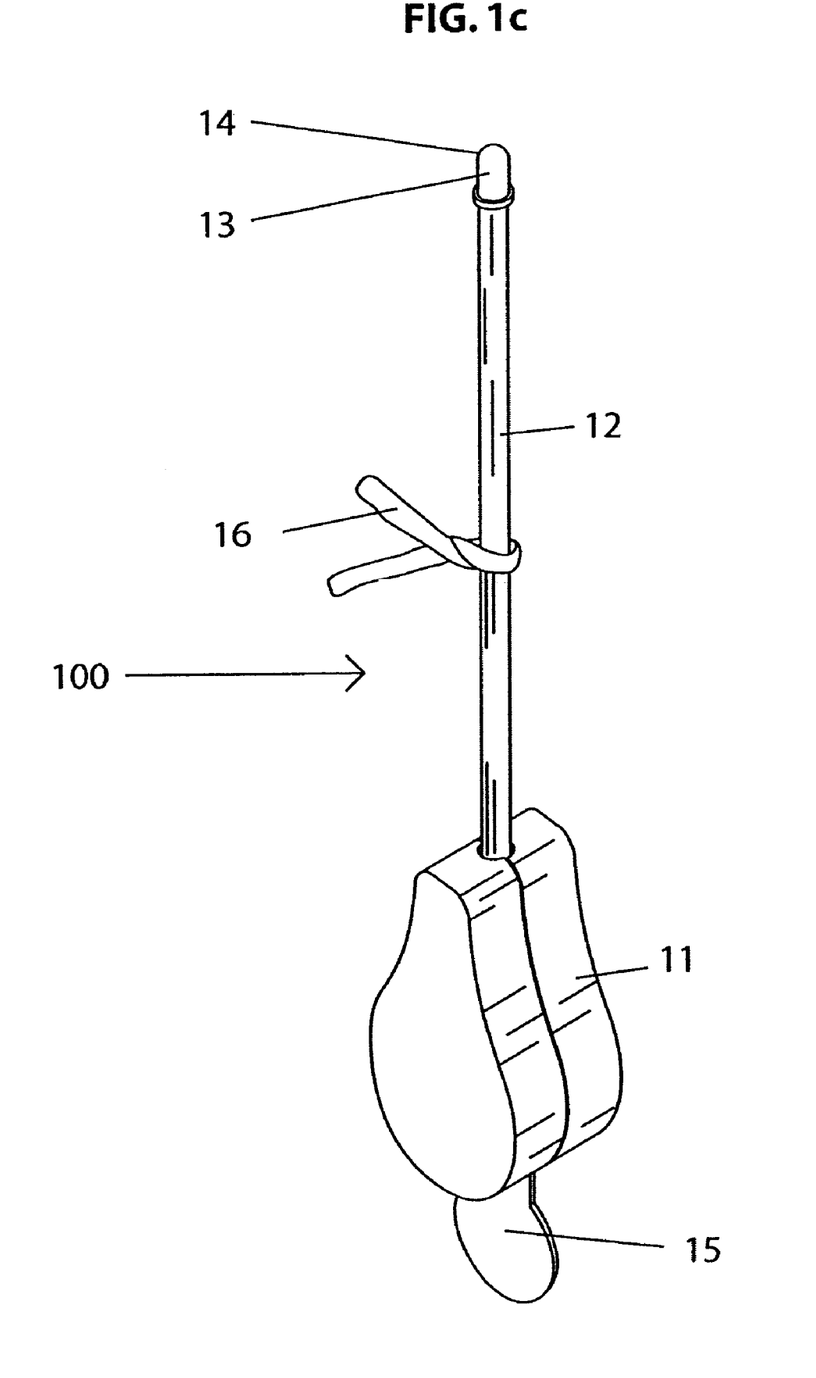
FIG. 1c illustrates an embodiment employing integral light source and penetrating tip.

FIG. 1c illustrates an alternate embodiment in which the penetrating tip 14 comprises a miniature LED or other light source, which light source, is of an appropriate size and shape to function as a penetrating tip.

Figure 2:
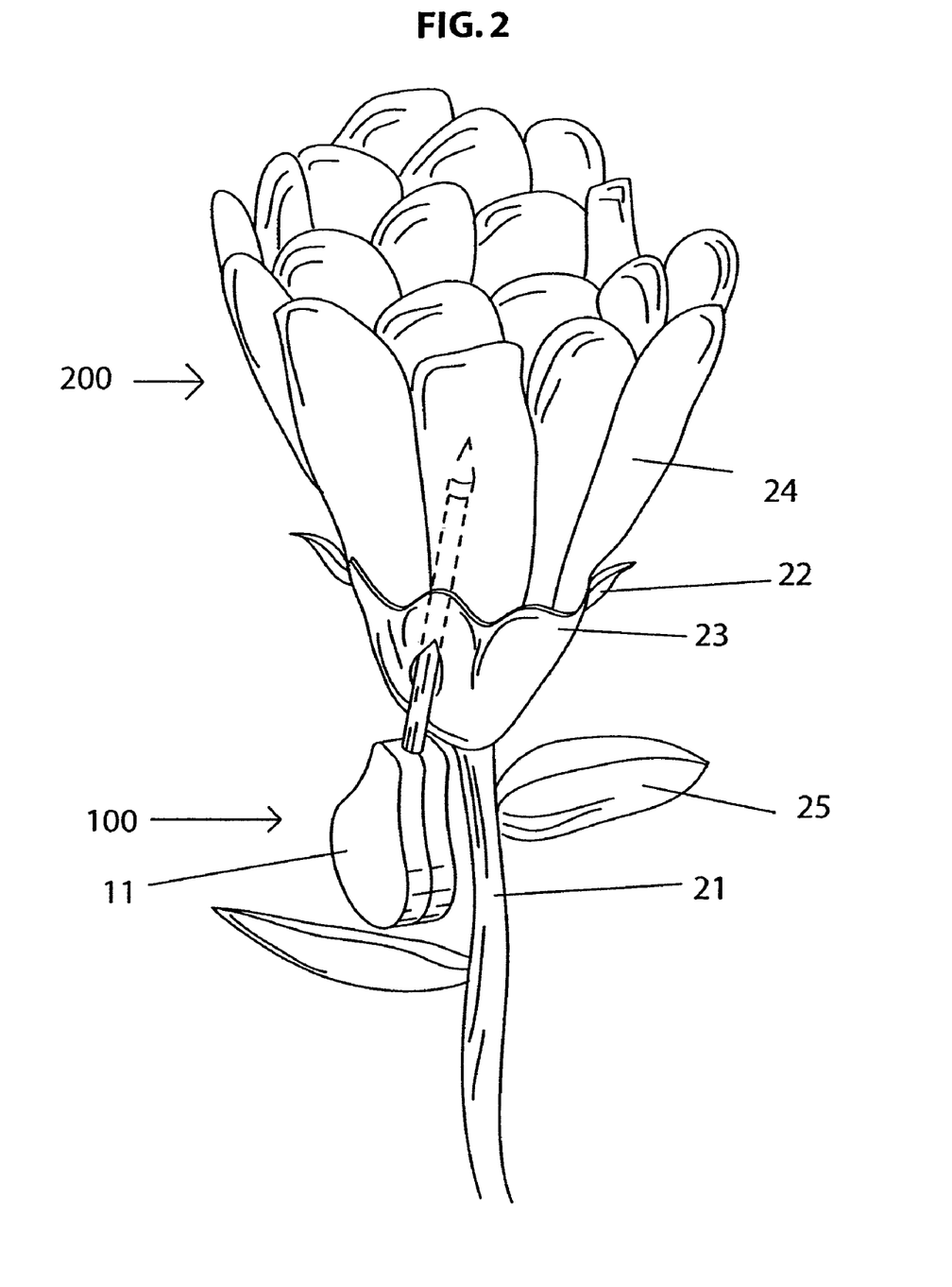
FIG. 2 shows the device of the instant invention in application.

Now, referring to FIG. 2, penetrating tip, 14 is inserted into the flower in or near the receptacle, 23 portion of the flower. This portion of the flower is situated between the peduncle and the calyx. If the receptacle is particularly tough or woody, penetrating tip 14 may be inserted directly into the petals 24 just above the upper portion of the receptacle. Case 11 is then manipulated so that penetrating tip 14 is positioned near the center of the flower or elsewhere as may be desired, e.g., within the corolla as illustrated in FIG. 2.

The exact position of the tip is determined at the time of insertion by observing the illumination pattern of the petals. The illumination focus may be adjusted from a small bright spot when the tip is very near the surface of the top of the flower petals to a larger, less intense area of glow as the tip is positioned more deeply into the corolla. In one version of the device of the instant invention tube 12 is fabricated from a 1/16 inch outside diameter brass tube and penetrating tip 14 was produced from clear acrylic plastic. Any tube and tip materials may be employed in any manner of size and shape so long as they meet the needs of the instant invention. Penetrating tip 14 may be attached to the distal end of tube 12 by means of clear epoxy adhesive or any other suitable method. Penetrating tip 14 is preferably hollow to fit over light source 13 and end of tube 12. Case 11 may be designed to resemble a leaf 25 or otherwise camouflaged so that it may be hidden in a flower arrangement.

Since the stem of a cut flower continues to provide hydration and some nutrients to the flower, it is desirable that the capillary process, which conveys these nutrients to the flower, not be significantly disturbed, otherwise the "life" of the flower will be compromised. Generally, the fibers and cellular structures, which form part of this nutrient supply system, are oriented longitudinally with respect to the growth direction of the plant. Evidence of this may be found by the manner in which a flower stem will split along its length. To minimize damage to the flower it is desired to sever as few of the capillaries as possible. This may be achieved by using a small penetrating tip 14 to split the flower at the desired point of insertion. Splitting of the flower is preferred as opposed to perforation. Penetrating tip 14 may comprise a sharpened tip for this purpose. An attachment means 16 in the form of a clip or tie may be employed to maintain relative position of flower illumination device 100 relative to flower 200. Alternately, or in addition, florist's tape may be employed for this purpose.

The overall illumination effect is dependent on the exact nature of the flower to be illuminated as well as the light emitting properties of light source 13. For example, a rose or carnation will provide a different look when lighted than an orchid. In flowers such as calla lilies the light source may be directly visible if viewed from above the flower. In this example, the flower glows from the outside and appears to have a "bright star" inside of it. The light emitted from the light source may comprise any color or combination of colors as may be desired. The apparent color of the item that is illuminated, for example, a white rose, is a function of not only the color of the item but also the light source. It is anticipated that the light source may be capable of generating a plurality of colors such as may be generated by a multicolored LED which colors may be controlled by an electronic circuit. Further, the light source may be steady or caused to flash or pulse in an interesting manner.

Figure 3:
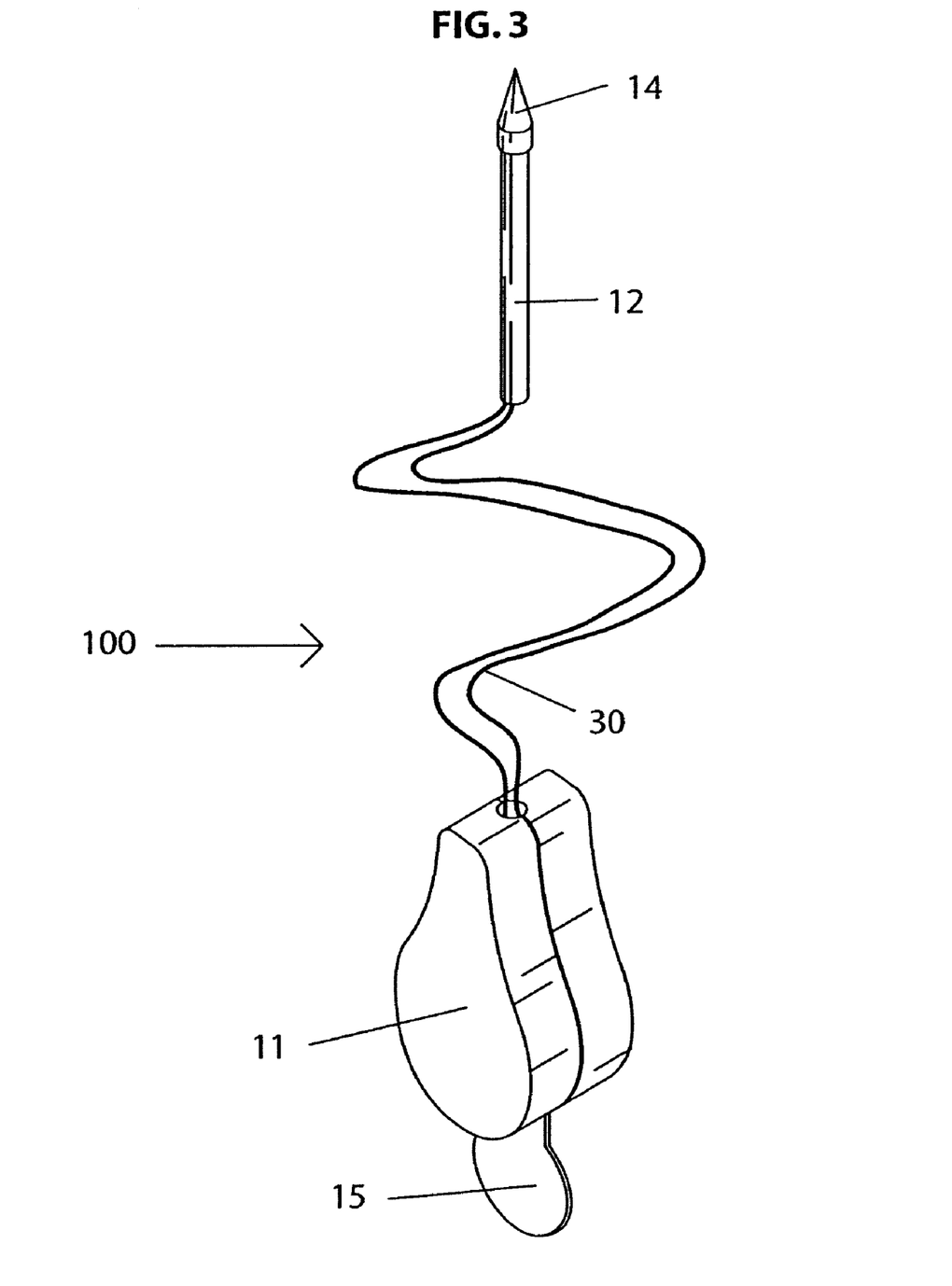
FIG. 3 illustrates a second embodiment of the instant invention with extended leads.
Figure 4:
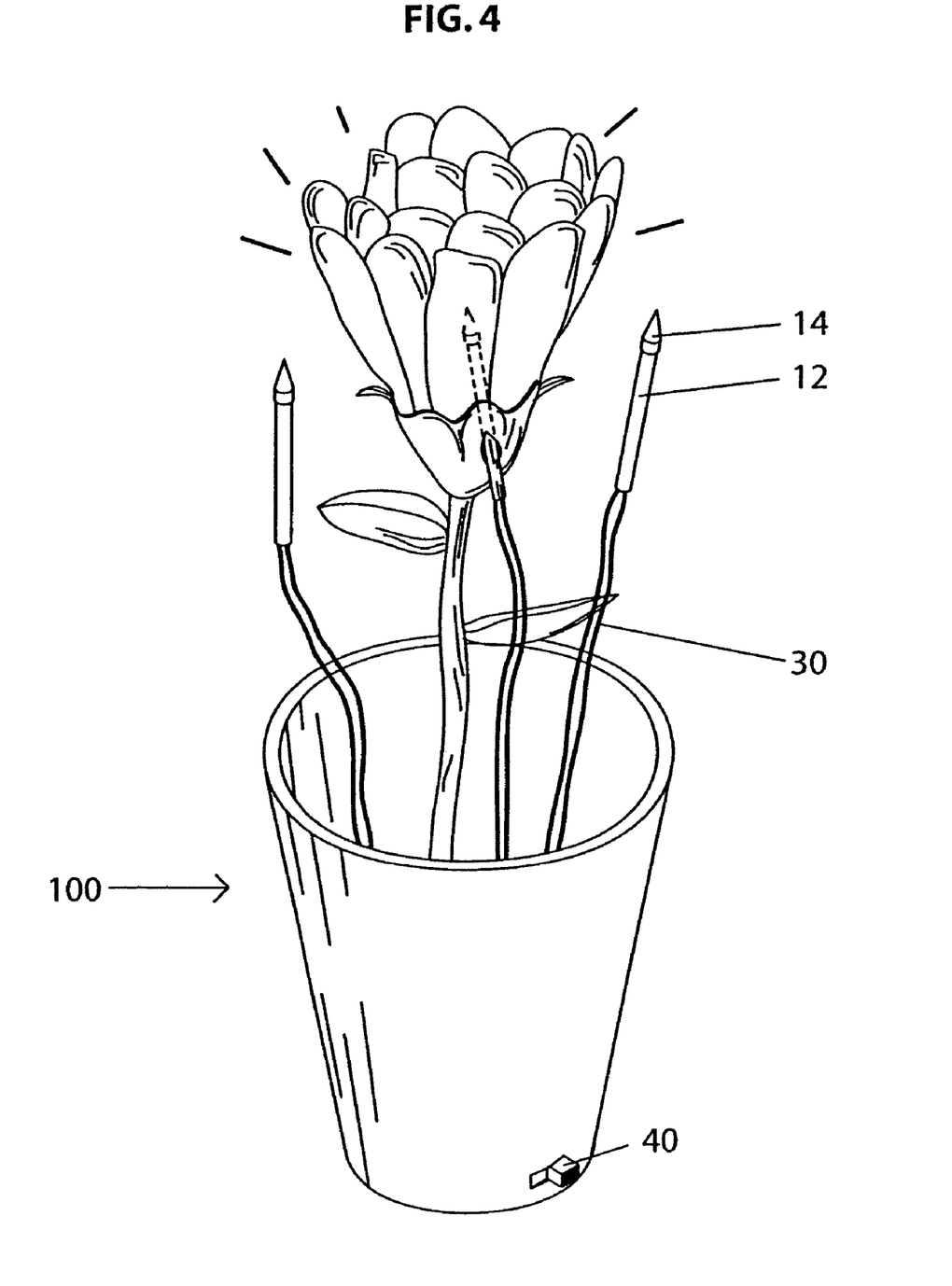
FIG. 4 illustrates a second embodiment of the instant invention with a plurality of tips.

In a second embodiment of the invention as shown in FIG. 3 and FIG. 4, flexible, electric wires 30 replace tube 12 or a portion of tube 12. In this embodiment, case 11 may be located a considerable distance from penetrating tip 14 such as in a vase containing a bouquet of flowers. Case 11 may be incorporated into the vase or even made integral to the vase which includes an on-off switch 40, as illustrated in FIG. 4. In this arrangement, the length of the penetrating tip may be extended somewhat to form a handle portion and to assist the user in piercing of the flower and manipulation of light source 13 within the flower.

Figure 5:
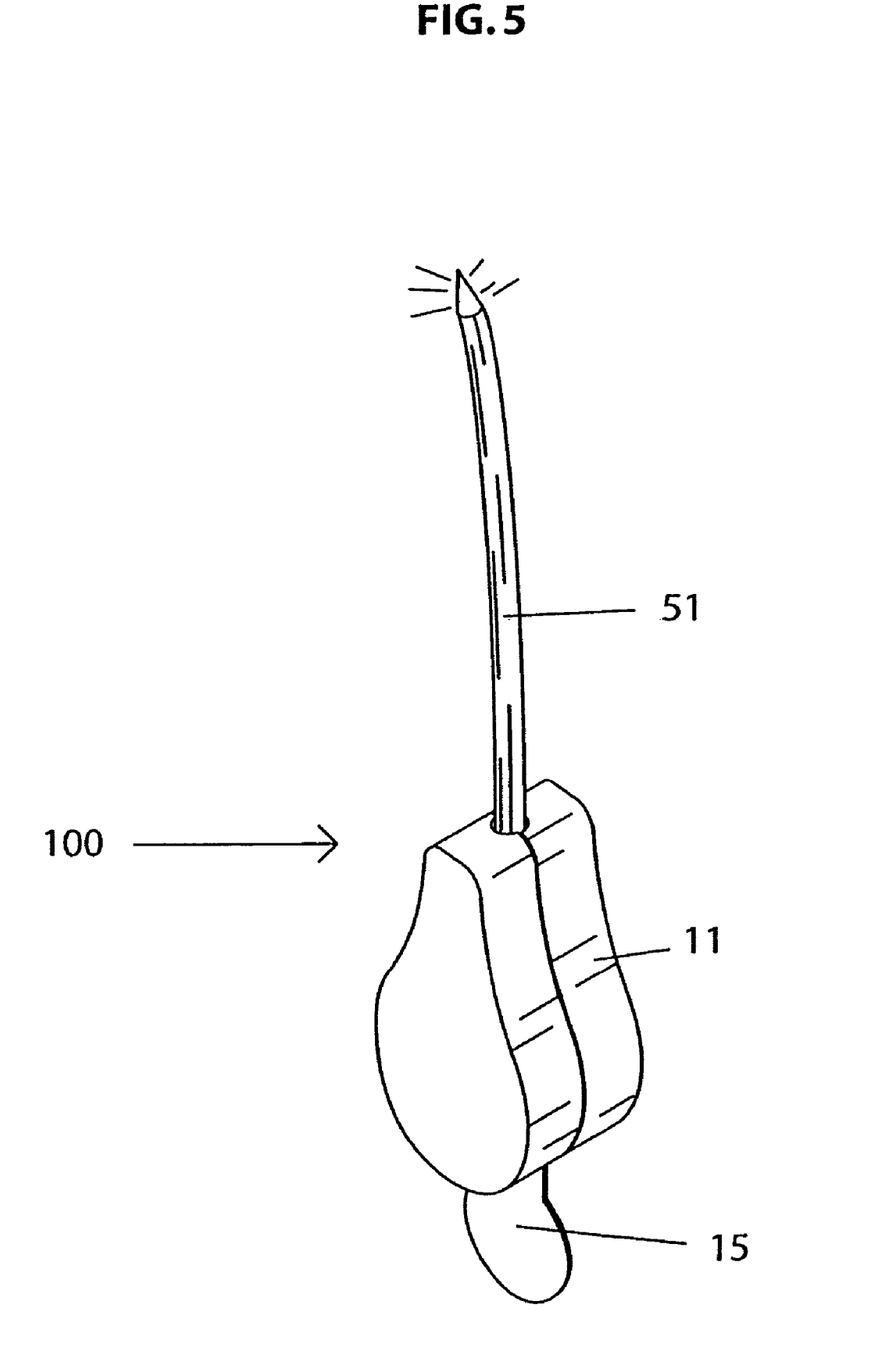
FIG. 5 shows a third embodiment of the device of the instant invention employing an optical fiber.

A third embodiment of the invention employs a light conducting member such as an optical fiber 51 to transmit light from a light source integral to case 11 to penetrating tip 14. In this case penetrating tip 14 may be integral to optical fiber 51.

The invention disclosed herein is anticipated to be used primarily with flowers however, the device may also be used to provide internal illumination of other products such as fruits or vegetables, for example, lemon, lime, or pineapple slices as may be served with tropical drinks. Similarly the device may be inserted into an olive or a cherry and served with a beverage. Additionally, the device can be inserted into soft cheeses, breads and the like as may be desired to create glowing appetizers.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A lighting device for internal illumination of plants comprising a case adapted to house a power source, a light source positioned within a tube having a diameter of about 1/16 inch, said light source connected to said power source by an electrical circuit, a penetrating tip located at a distal end of said tube, said distal end of said tube surrounding said light source whereby said penetrating tip may be inserted inside a plant and transmit visible light through the structure of the plant.

2. A lighting device of claim 1 comprising said case being of a size and shape to be supported by a plant without deformation thereof, a switch in said electrical circuit, said switch including a removable insulator whereby removing said insulator causes said light source to illuminate.

3. A lighting device of claim 2 comprising at least one battery in said case, a thin insulator positioned between said battery and said light source, a portion of said insulator extending beyond said case whereby said insulator is grasped and removed from said case thereby completing said electrical circuit.

4. A lighting device of claim 1 wherein said tube is elongated and connected at one end to said light source, said electrical circuit partially enclosed in said tube.

5. A lighting device of claim 4 comprising said penetrating tip permanently attached to said one end of said tube, said penetrating tip transmitting light from said light source.

6. A lighting device of claim 5 comprising said penetrating tip being a conically shaped polymer with the apex forming said penetrating tip.

7. A lighting device of claim 1 said tube is electrically coupled to said case by flexible wires, said wires operatively connected to said electrical circuit whereby the location of said light source is adjustable relative to the location of said case.

8. A lighting device for internal illumination of plants comprising a case, at least one battery disposed in said case, a light source connected to one end of a rigid elongated tube having an outside diameter of about 1/16 inch, a conically shaped penetrating tip surrounding said light source and connected to said one end of said tube, said penetrating tip transmitting visible light, an electrical circuit connecting said at least one battery and said light source through said tube, said case including an off-on switch controlling said electrical circuit to produce illumination, said device being of a size and shape to be supported by a plant without deformation thereof whereby said penetrating tip is inserted into the plant by manipulating said tube, said visible light illuminating the structure of said plant.

9. A lighting device of claim 8 comprising two batteries in said case, said off-on switch having a thin insulator positioned between said batteries, a portion of said insulator extending beyond said case whereby said insulator is grasped and removed from said case thereby completing said electrical circuit.

10. A lighting device of claim 8 comprising said tube connected at the other end to said case.

11. A method of illuminating the internal structure of a plant comprising the steps of:

a) providing a lighting device for internal illumination of plants comprising a case, a power source disposed in said case, a light source connected to one end of a tube, a conically shaped penetrating tip surrounding said light source and connected to said one end of said tube, said penetrating tip transmitting visible light, an electrical circuit connecting said power source and said light source through said tube, said case including an off-on switch controlling said electrical circuit to produce illumination, said device being of a size and shape to be supported by a plant without deformation thereof;

b) providing a plant having stem and a bloom;

c) manipulating said tube to insert said penetrating tip within said plant to a desired location to illuminate said bloom; and d) operating said off-on switch to illuminate said light source thereby providing visible light through said plant.

* * * * *